US010831002B1

(12) United States Patent
Li et al.

(10) Patent No.: US 10,831,002 B1
(45) Date of Patent: Nov. 10, 2020

(54) LARGE APERTURE ANAMORPHIC LENS (71) Applicant: GUANGDONG SIRUI OPTICAL CO., LTD., Zhongshan (CN)

(72) Inventors: Jie Li, Zhongshan (CN); Wei Wu, Zhongshan (CN); Wulin Li, Zhongshan (CN)

(73) Assignee: Guangdong Sirui Optical Co., Ltd., Zhongshan (CN)

(*) Notice: Subject to any disclaimer, the term of this patent is extended or adjusted under 35 U.S.C. 154(b) by 0 days.

(21) Appl. No.: 16/889,678

(22) Filed: Jun. 1, 2020

Related U.S. Application Data

(63) Continuation of application No. 16/753,392, filed as application No. PCT/CN2019/128519 on Dec. 26, 2019, said application No. 16/889,678 is a continuation-in-part of application No. 16/753,399, filed on Apr. 3, 2020.

(30) Foreign Application Priority Data

Nov. 27, 2019 (CN) .......................... 2019 1 1186730

(51) Int. Cl.
*G02B 13/08* (2006.01)
(52) U.S. Cl.
CPC .................... *G02B 13/08* (2013.01)
(58) Field of Classification Search
CPC ............. G02B 13/001; G02B 13/0015; G02B 13/0088; G02B 13/006; G02B 13/0075
See application file for complete search history.

(56) References Cited

U.S. PATENT DOCUMENTS 6,512,636 B2 * 1/2003 Schauss ................. G02B 13/08
359/668

FOREIGN PATENT DOCUMENTS

| CN | 104007541 A | 8/2014 |
| CN | 105467566 A | 4/2016 |
| CN | 107479173 A | 12/2017 |
| CN | 107907976 A | 4/2018 |
| CN | 207516627 U | 6/2018 |
| JP | 4332923 B2 | 9/2009 |

* cited by examiner

*Primary Examiner* — Robert E. Tallman
(74) *Attorney, Agent, or Firm* — Loeb & Loeb LLP (57) ABSTRACT

A large aperture anamorphic lens includes a cylindrical lens group arranged in a direction from an object side to an image side. The cylindrical lens group includes a anamorphic group and together form an imaging group. The anamorphic group includes a first lens, a second lens, and a third lens arranged in a direction of an object side to an image side. The first lens and the second lens may be a negative optical power cylindrical lens, and the third lens may be a positive optical power cylindrical lens. Through the optical characteristics of the cylindrical lens in the anamorphic group, the entering horizontal light is compressed while the vertical light path maintains unchanged. The imaging group comprehensively corrects the light so that the horizontal field of view angle is increased by about 33% to achieve a magnification by 1.33 times for an anamorphic shooting.

11 Claims, 6 Drawing Sheets

LARGE APERTURE ANAMORPHIC LENS

CROSS-REFERENCE TO RELATED APPLICATION

This is a US continuation application claiming priority to a US national stage application, Ser. No. 16/753,392, filed on Apr. 3, 2020, which claims priority to PCT international application serial number PCT/CN2019/128519, filed on Dec. 26, 2019, which claims priority to a Chinese patent application, application number 201911186730.4, filed on Nov. 27, 2019. The present application also claims priority to a U.S. design application Ser. No. 29/729,658, filed on Mar. 29, 2020, which claims priority to a Chinese design application 201930656498.2, filed on Nov. 22, 2019. All these applications are incorporated by reference in their entirety herein.

TECHNICAL FIELD

The present invention relates generally to the field of lens technology, and in particular, to a 35 millimeter (mm) focal length half-frame large aperture anamorphic lens.

BACKGROUND

With the rapid development of web technology, taking photos and videos has become essential part for ordinary consumers. With the promotion of 5G and other technologies in recent years, more and more video sharing such as Vlog has been used. More individuals shoot short films and micro movies with mobile phones, cameras and other tools.

However, the current normal shooting screen ratio of mobile phones, tablets, cameras and other devices on the market is 16:9, but the cinematic widescreen video ratio is 2.4:1. Therefore, users need to manually edit or digitally cropping method to edit the captured images or videos. However, the pixels of the pictures are sacrificed during cropping or editing.

Some professional anamorphic lens brands such as, Hawk from Germany, Cooke from Great Britain, ARRI from Germany, Panavision from the USA, Angenieux from France and SLR from Hong Kong are usually tailored for professional customers. The prices of these film equipment are generally over tens of thousands of dollars or even more expensive, and anamorphic lenses themselves weighs several kilograms.

Expensive and quality professional anamorphic lenses are not suitable for ordinary users. Therefore, how to reduce the size of large aperture anamorphic lens and reducing the weight of the lens are technical problems that are to be solved at present embodiments of the invention.

SUMMARY

Therefore, embodiments of the invention attempt technically solve shortcomings in the professional large aperture anamorphic lens where the quality is great but at a cost that ordinary consumers could not afford. Aspects of the invention provide a large aperture anamorphic lens that solve the technical problem with the following embodiments:

A large aperture anamorphic lens may include cylindrical lens group in an arrangement of an object side to an image side. The cylindrical lens group may include a anamorphic group of cylindrical lenses and an imaging group having spherical lenses. The anamorphic group may include a first lens, a second lens and a third lens in a sequential order from the object side to the image side. The first lens and the second lens may be negative optical power cylindrical lens and the third lens may be a positive optical power cylindrical lens. The imaging group in a direction of light toward the image side may dispose a fourth lens to Nth lens in a sequential order, where N is greater than or equal to a natural number of 10.

The power distribution of the lenses constituting the anamorphic group and the lenses constituting the imaging group may satisfy the following relationship:

$$300 < \text{abs}(f_{1-3}/f_{4-N});$$

$$30 \text{ mm} < f_{4-N} < 1.50;$$

$$1.20 < f_{4-N}/f_{1-3} < 1.50;$$

Where, f may represent a focal length of the lens in X direction, where the subscript number of f represents a number of the twelve lenses of the anamorphic lens. For example, $f_1$ may be the focal length in the X direction of the first lens, and $f_{1-N}$ may be the combined focal length of the first to Nth lenses in the X direction of N number of lenses, and so on.

In yet another embodiment, the imaging group in a direction of light toward the image side may dispose a fourth lens, a fifth lens, a sixth lens, a seventh lens, an eighth lens, a ninth lens, a tenth lens, an eleventh lens, and a twelve lenses.

In such an arrangement, the power distribution of the lenses constituting the anamorphic group and the lenses constituting the imaging group may satisfy the following relationship:

$$-1.40 < f_{2-3}/f_1 < -1.25;$$

$$1.50 < f_{4-7}/f_{4-12} < 2.60;$$

$$0.60 < f_{8-12}/f_{4-12} < 0.80;$$

$$0.90 < f_{10-12}/f_{8-12} < 1.30;$$

Where, f may represent a focal length of the lens in X direction, where the subscript number of f represents a number of the twelve lenses of the anamorphic lens. For example, $f_1$ may be the focal length in the X direction of the first lens, and $f_{1-12}$ may be the combined focal length of the first to 12th lenses in the X direction of twelve lenses, and so on.

In one embodiment, the fourth lens, the seventh lens, the eighth lens, and the twelfth lens may be negative optical power spherical lenses. In another embodiment, the fifth lens, the sixth lens, the ninth lens, and the tenth lens and the eleventh lens may be both positive optical power spherical lenses.

In a further embodiment, the second lens and the third lens may be joined together.

In a further embodiment, the sixth lens and the seventh lens may be joined together.

In a further embodiment, the eighth lens and the ninth lens may be joined together.

In a further embodiment, the eleventh lens and the twelfth lens may be joined together.

In a further embodiment, the length of the anamorphic lens may be less than 115 mm, and the large outer diameter of the anamorphic lens may be less than 80 mm.

In a further embodiment, the focal length in the Y direction of the anamorphic lens may be 35 mm, and the aperture may be an f-stop of 1.8.

In a further embodiment, the mass of the anamorphic lens may be less than 700 g.

The technical solution of the present invention may include the following advantages:

1. A large aperture anamorphic lens as provided by embodiments of the present invention may include a cylindrical lens arranged from the object side to the image side as a anamorphic group and an imaging group including spherical lenses. The anamorphic group may include a first lens, a second lens, and a third lens that are disposed in a sequential order, and the first lens and the second lens may be negative optical power cylindrical lens, and the third lens may be a positive optical power cylindrical lens.

Use the optical characteristics of the cylindrical lenses in the anamorphic group to "compress" the horizontally entering light while the light entering in the vertical direction remains unchanged, the imaging group thereafter may comprehensively correct the light passing therethrough. Such aspects may increase the angle of field of view for the horizontal shooting of the lens, which may increase the width the field of the actual shot or filming. Aspects of the invention no longer need post-processing or editing of the images or films, so that users may still obtain a ratio of 2.4:1 for a widescreen video or photos without sacrificing pixels as a result of the editing. At the same time, because the anamorphic group may be include a cylindrical lens, the anamorphic lens of embodiments of the invention may further include an oval shaped out-of-focus flare, sci-fi line flare, and other optical characteristics in addition to the anamorphic function.

2. The large aperture anamorphic lens as provided by embodiments of the present invention may include the power distribution relationship of the lens in the anamorphic group, and the lens in the imaging group:

$$300 < \mathrm{abs}(f_{1-3}/f_{4-12});\ 30\ \mathrm{mm} < f_{4-12} < 40\ \mathrm{mm};\ 1.20 < f_{4-12}/f_{1-12} < 1.50;\ -1.40 < f_{2-3}/f_1 < -1.30;\ 1.50 < f_{4-7}/f_{4-12} < 2.60;\ 0.60 < f_{8-12}/f_{4-12} < 0.80;\ 0.90 < f_{10-12}/f_{8-12} < 1.30;$$

Where, f may represent a focal length of the lens in X direction, where the subscript number of f represents a number of the twelve lenses of the anamorphic lens. For example, $f_1$ may be the focal length in the X direction of the first lens, and $f_{1-12}$ may be the combined focal length of the first to 12th lenses in the X direction of twelve lenses, and so on.

Embodiments of the invention may increase the field of view of 35 mm f/stop of 1.8 half-frame lens horizontally by 33%, while the vertical field of view may remain the same, resulting in a smaller 35 mm anamorphic lens with a large aperture.

DESCRIPTION OF THE DRAWINGS

In order to more clearly illustrate the specific embodiments of the present invention or the technical solutions in the prior art, the drawings needed to be used in embodiments or the description of the prior art are briefly introduced below. Obviously, the drawings in the following are some embodiments of the present invention. For those of ordinary skill in the art, other drawings may be obtained based on these drawings without undue creative labor.

The following lists the labels for the reference numbers:
1—first lens; 2—second lens; 3—third lens; 4—fourth lens; 5—fifth lens; 6—sixth lens; 7—seventh lens; 8—eighth lens; 9—ninth lens; 10—tenth lens; 11—eleventh lens; 12—twelfth lens; 13—anamorphic group; 14—imaging group.

DETAILED DESCRIPTION

The technical solution of the present invention may be clearly and completely described below with reference to the accompanying drawings. Obviously, the described embodiments may be part of the present invention, but not all of them. Based on the embodiments of the present invention, all other embodiments obtained by a person of ordinary skill in the art without creative efforts shall fall within the protection scope of the present invention.

In the description of the present invention, it is noted that the terms "center", "up", "down", "left", "right", "vertical", "horizontal", "inside", "outside", etc., are meant to indicate orientation or positional relationship and they may be based on the orientation or positional relationship shown in the drawings, and may only be for the convenience of describing the present invention and simplified description, and does not indicate or imply that the device or element referred to must have a specific orientation, a specific construction and operation as they are not be construed as limiting the invention. In addition, the terms "first," "second," and "third" may be used for descriptive purposes only, and should not be construed to indicate or imply relative importance.

In the description of embodiments of the present invention, it is noted that the terms "installation", "connected", and "connected" should be understood in a broad sense unless otherwise specified and limited. For example, they may be fixed connections or removable, connected or integrated; it may be mechanical or electrical; it may be directly connected, or it may be indirectly connected through an intermediate medium, or it may be the internal communication of two elements. For those of ordinary skill in the art, the specific meanings of the above terms of embodiments of the present invention may be understood in a case-by-case basis.

In addition, the technical features involved in the different embodiments of the present invention described below may be combined with each other as long as they do not conflict with each other.

Example 1

Figure 1:
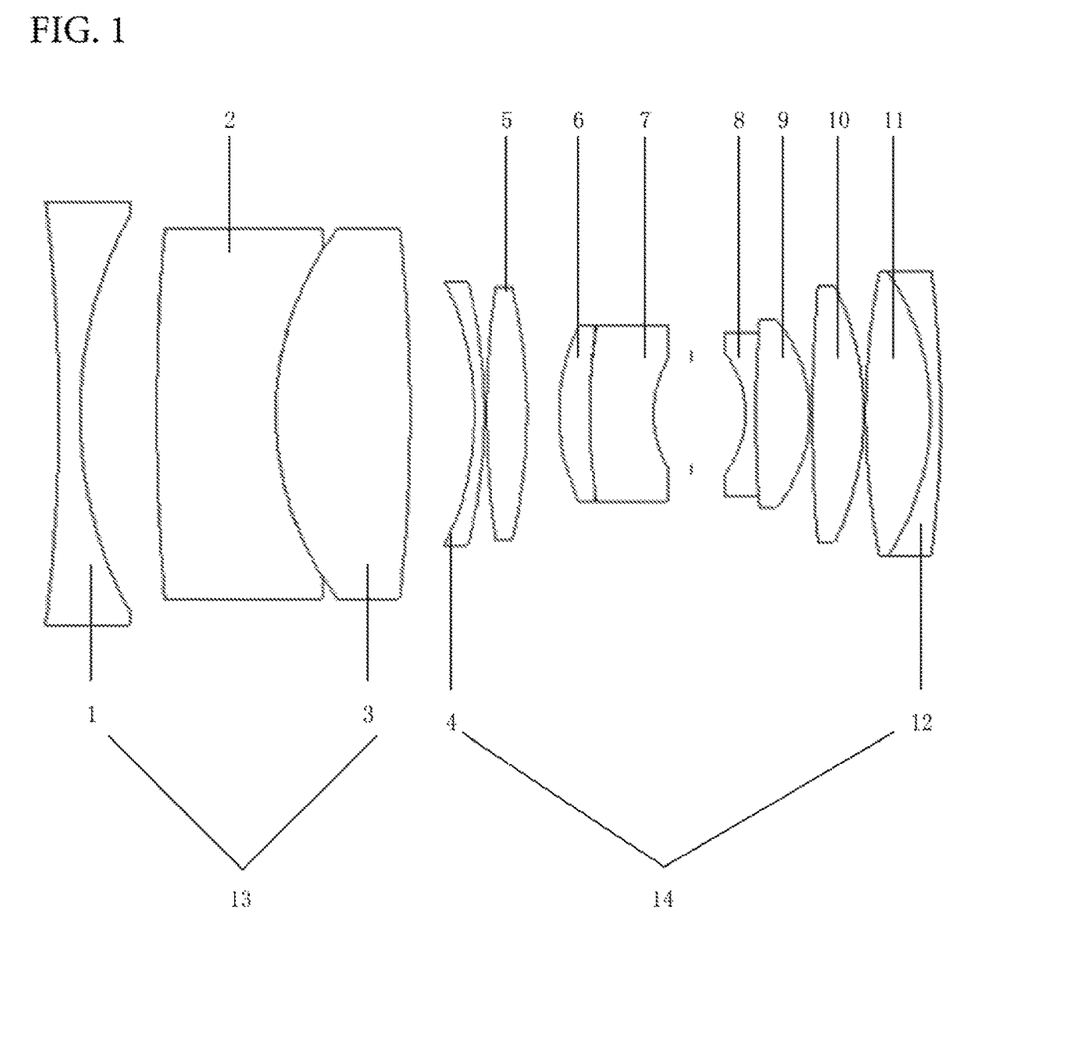
FIG. 1 is an optical structure diagram in an X direction according to a first embodiment of the present invention.
Figure 2:
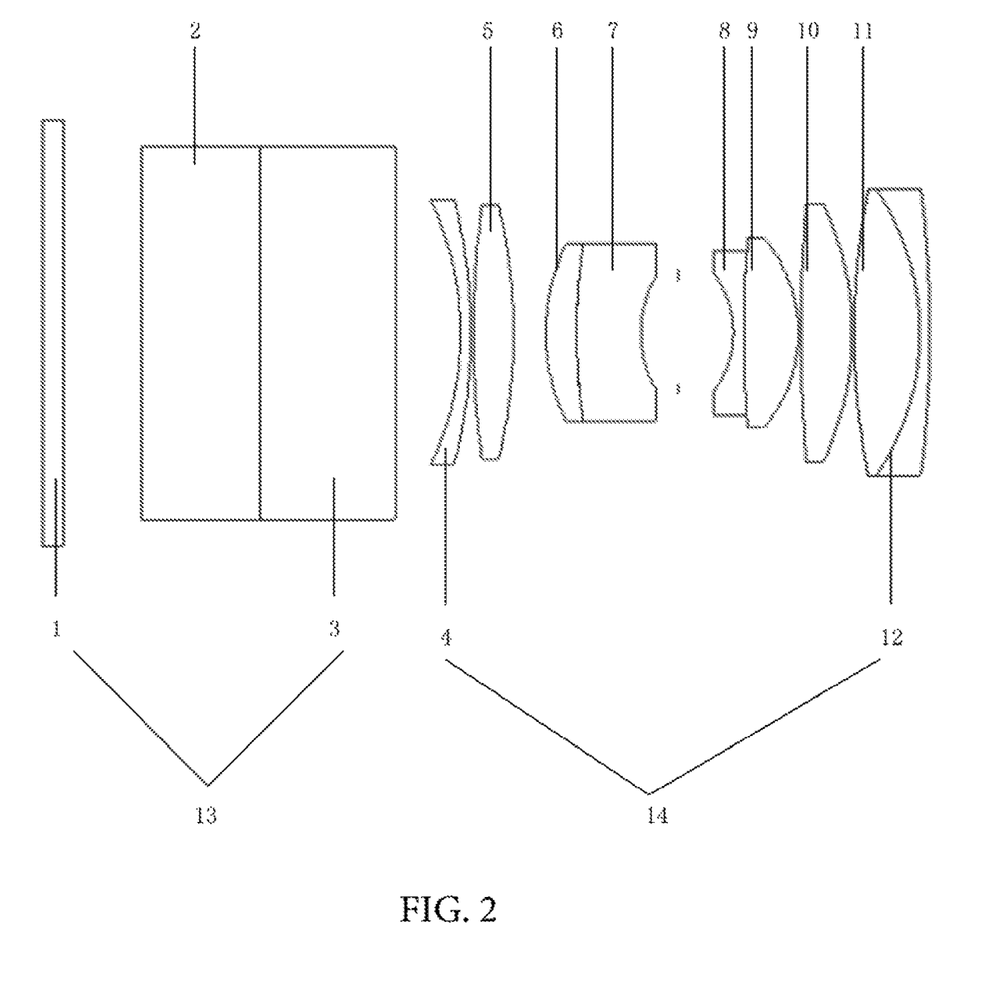
FIG. 2 is an optical structure diagram in an Y direction according to a first embodiment of the present invention.

As shown in FIG. 1 and FIG. 2, one embodiment may include a 35 mm focal length anamorphic lens with large aperture. In one embodiment, the lens described below may be transparent lens. The anamorphic lens may include twelve lenses arranged along the optical path from an object side to an image side, which may include a first lens 1, a second lens 2, a third lens 3, a fourth lens 4, a fifth lens 5, a sixth lens 6, a seventh lens 7, an eighth lens 8, a ninth lens 9, a tenth lens 10, an eleventh lens 11 and a twelfth lens 12.

In one embodiment, the first lens 1, the second lens 2, and the third lens 3 may be cylindrical lenses. The second lens 2 and the third lens 3 may be joined together. Together with the first lens 1 to form an anamorphic group 13. The fourth lens 4, the fifth lens 5, the sixth lens 6, the seventh lens 7, the eighth lens 8, the ninth lens 9, the tenth lens 10, the eleventh lens 11 and the twelfth lens 12 may form an imaging group 14.

In one embodiment, the first lens 1 may be a negative optical power cylindrical lens, the second lens 2 may be a negative cylindrical lens, and the third lens 3 may be a positive optical power cylindrical lens.

In a further embodiment, the fourth lens 4, the fifth lens 5, the sixth lens 6, the seventh lens 7, the eighth lens 8, the ninth lens 9, the tenth lens 10, the eleventh lens 11 and the twelfth lens 12 may be spherical lens. In one embodiment, the fourth lens 4, the seventh lens 7, the eighth lens 8, and the twelfth lens 12 may be all negative optical power spherical lenses. In another embodiment, the five lenses 5, the sixth lens 6, the ninth lens 9, the tenth lens 10, and the eleventh lens 11 may be all positive focal degree spherical lens. In yet another embodiment, the sixth lens 6 and the seventh lens 7 may be joined together; the eighth lens 8 and the ninth lens 9 may be joined together; and the eleventh lens 11 and the twelfth lens 12 may be joined together.

In one embodiment, the lenses that may be joined together may be consider as a unit. In this embodiment, the second lens 2 and the third lens 3 may be joined together; the sixth lens 6 and the seventh lens 7 may be joined together; the eighth lens 8 and the ninth lens 9 may be joined together; and the eleventh lens 11 and the twelfth lens 12 may be joined together. Therefore, in such an embodiment, the anamorphic lens may be composed of 12 lenses and 8 groups.

In a further embodiment, the combinations of the second lens 2 and the third lens 3, the sixth lens 6 and the seventh lens 7, the eighth lens 8 and the ninth lens 9, the eleventh lens 11 and the twelfth lens 12 are not specific limitation. For example, in this embodiment, the joining method may be via bonding. As an alternative embodiment, based on the spirit and scope of the present invention, in order to distinguish it from embodiments of the present application, the above-mentioned combination methods may be modified, such as lamination, gluing, integrated molding, or the like. After such bonding, the shape of the composite or combined lens may then be appropriately adjusted according to the above examples. Therefore, these alternative approaches may also be within the scope and spirit of the invention.

In one embodiment, specific numerical values of the actual parameters of each lens are not specifically limited. In this embodiment, the power of each lens or lens group may satisfy the following mathematical relationship:

$$300 < abs(f_{1-3}/f_{4-12});$$

$$30 \text{ mm} \leq f_{4-12} < 40 \text{ mm};$$

$$1.20 \leq f_{4-12}/f_{1-12} < 1.50;$$

$$-1.40 \leq f_{2-3}/f_1 < -1.30;$$

$$1.50 \leq f_{4-7}/f_{4-12} < 2.60;$$

$$0.60 \leq f_{8-12}/f_{4-12} < 0.80;$$

$$0.90 \leq f_{10-12}/f_{8-12} < 1.30;$$

Where, f may represent a focal length of the lens in X direction (e.g., horizontal direction), where the subscript number of f represents a number of the twelve lenses of the anamorphic lens. For example, $f_1$ may be the focal length in the X direction of the first lens, and $f_{1-12}$ may be the combined focal length of the first to 12th lenses in the X direction of twelve lenses, and so on.

The following table may be The actual parameters of each lens of this embodiment that meet the above mathematical relationship are listed below:

| Lens | Surface Shape | radius (mm) | Thickness (mm) | Refractive index | Abbe Number | Mass (g) |
|---|---|---|---|---|---|---|
| First lens | Cylindrical | −198.20 | 2.50 | 1.653 | 57.43 | 44.20 |
|  | Cylindrical | 49.70 | 8.98 |  |  |  |
| Second lens | Cylindrical | 245.30 | 14.00 | 1.718 | 23.80 | 72.20 |
| Third lens | Cylindrical | 36.26 | 15.71 | 1.916 | 31.10 | 46.60 |
|  | Cylindrical | −190.26 | 7.50 |  |  |  |
| Fourth lens | Spherical | −35.89 | 1.20 | 1.697 | 25.02 | 14.00 |
|  | Spherical | −62.48 | 0.30 |  |  |  |
| Fifth lens | Spherical | 110.14 | 4.66 | 1.804 | 46.59 | 9.20 |
|  | Spherical | −64.77 | 3.75 |  |  |  |
| Sixth lens | Spherical | 23.61 | 3.62 | 1.903 | 35.84 | 7.60 |
| Seventh lens | Spherical | 71.94 | 7.46 | 1.620 | 30.80 | 11.20 |
|  | Spherical | 13.06 | 4.37 |  |  |  |
| Light bar |  | inf | 6.41 |  |  |  |
| Eighth lens | Spherical | −11.59 | 1.20 | 1.879 | 25.37 | 4.30 |
| Ninth lens | Spherical | 137.18 | 6.41 | 1.785 | 47.79 | 12.50 |
|  | Spherical | −17.17 | 0.30 |  |  |  |
| Tenth lens | Spherical | 185.55 | 5.95 | 1.912 | 34.31 | 8.50 |
|  | Spherical | −35.19 | 0.24 |  |  |  |
| Eleventh lens | Spherical | 87.43 | 7.61 | 1.760 | 49.55 | 14.20 |
| Twelfth lens | Spherical | −30.20 | 1.20 | 1.913 | 33.44 | 8.40 |
|  | Spherical | −133.01 | 18.30 |  |  |  |

In one aspect, the first through the third lenses may be cylindrical lenses and the fourth through the twelfth lenses are spherical lenses.

In one aspect, before applying the anamorphic lens of the invention, a field of view of a given 35 mm lens with f/stop of 1.8 as the focal length is: V (vertical) 25.42 degree, H (horizontal) 37.39 degree.

After applying the anamorphic lens of embodiments of the invention, the field of view of the given 35 mm lens with f/stop of 1.8 as the focal length is: V (vertical) 25.42 degree, H (horizontal) 49.85 degree.

The angle of view of the contrast test field of view is unchanged in the vertical direction, and the angle of field deformation in the horizontal direction comparison is: 49.85/37.39=1.333.

In such an embodiment, the actual width ratio is in the range of 2.35-2.40, so the anamorphic ratio is 1.33. For example, the horizontal field of view angle is increased by 33%, so that 1.33 times anamorphic shooting may be achieved.

According to embodiments of the invention, when the anamorphic lens according to aspects of the invention is manufactured, the length of the anamorphic lens itself is less than 115 mm, with a maximum outer diameter less than 80 mm, and a mass less than 700 g. Such dimension is far smaller than similar type photographic camera interchangeable lenses, and, at the same time, it is far smaller than the professional cinema anamorphic lenses of the same specifications on the market.

In a further embodiment, no limitation is directed to the materials used for the lenses. For example, embodiments of the invention may use optical grade glasses for the lenses.

Moreover, the lens of the present application may be designed to be compatible with the bayonet of various brands of camera in the market according to the actual use's specification, so as to achieve personalized customization and universal use.

Example 2

Figure 3:
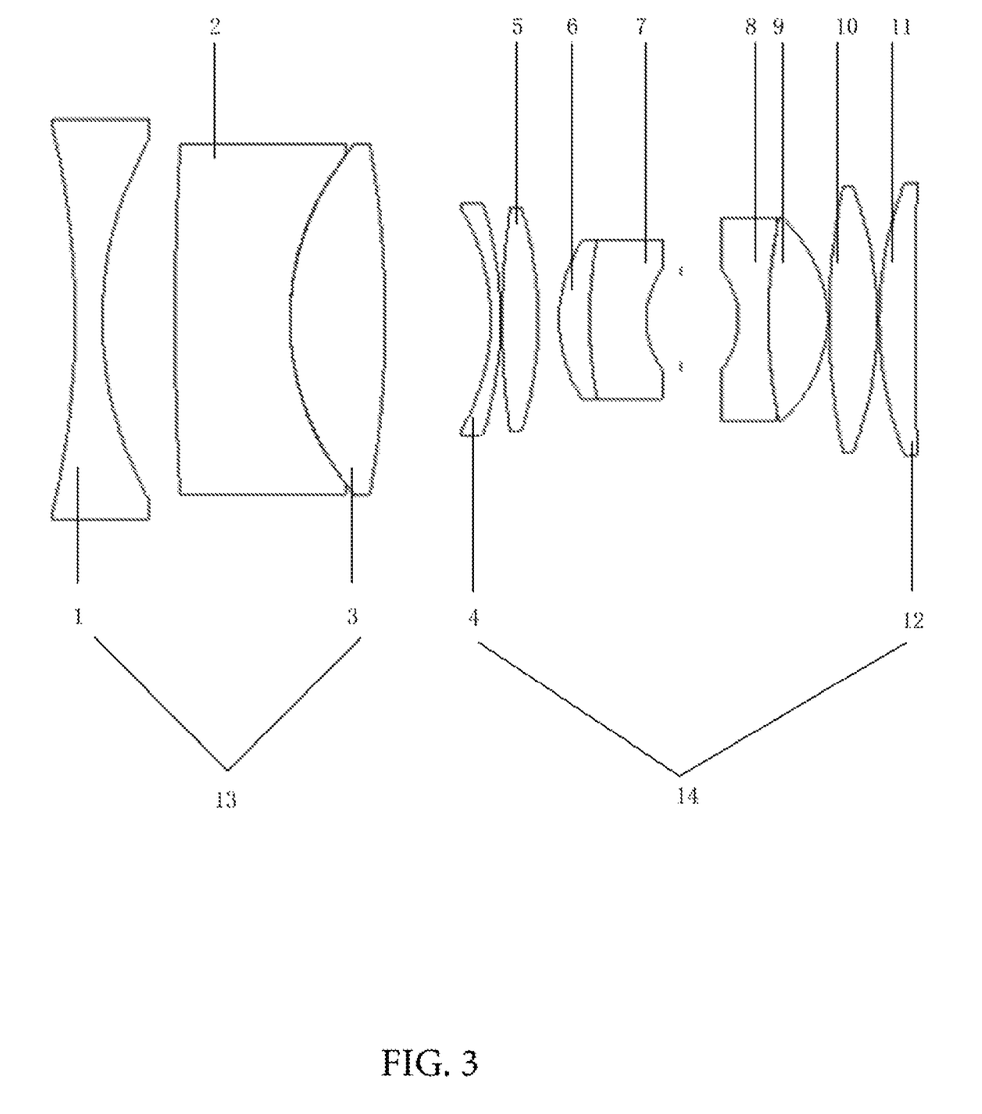
FIG. 3 is an optical structure diagram in an X direction according to a second embodiment of the present invention.
Figure 4:
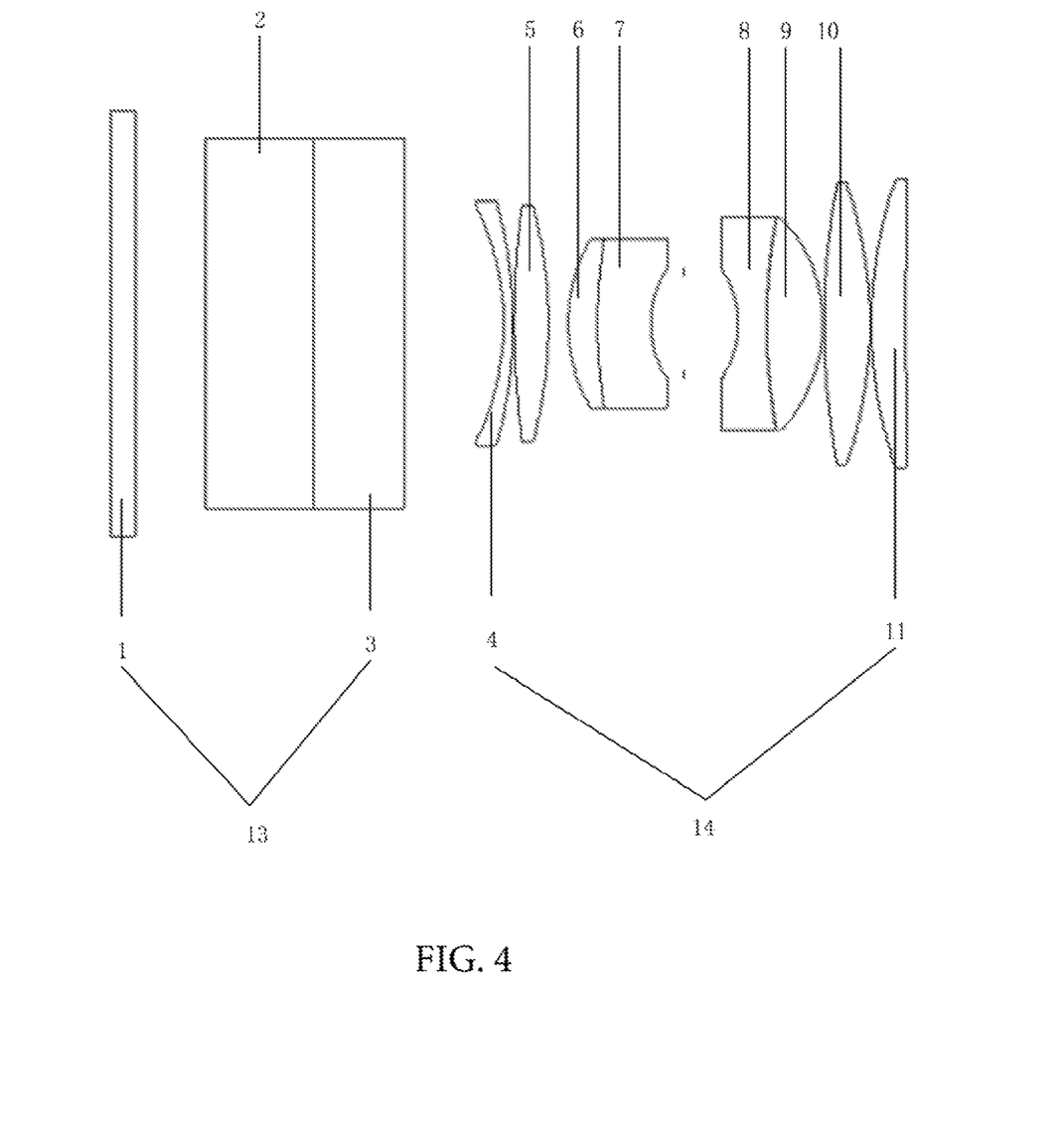
FIG. 4 is an optical structure diagram in an Y direction according to a second embodiment of the present invention.

As shown in FIG. 3 and FIG. 4, embodiments of the invention may provide a 35 mm focal length half-frame large aperture anamorphic lens. In one example, Example 2 differs from the Example 1 in that the combined lenses of the eleventh lens and the twelfth lens may be replaced by a spherical lens.

Example 3

Figure 5:
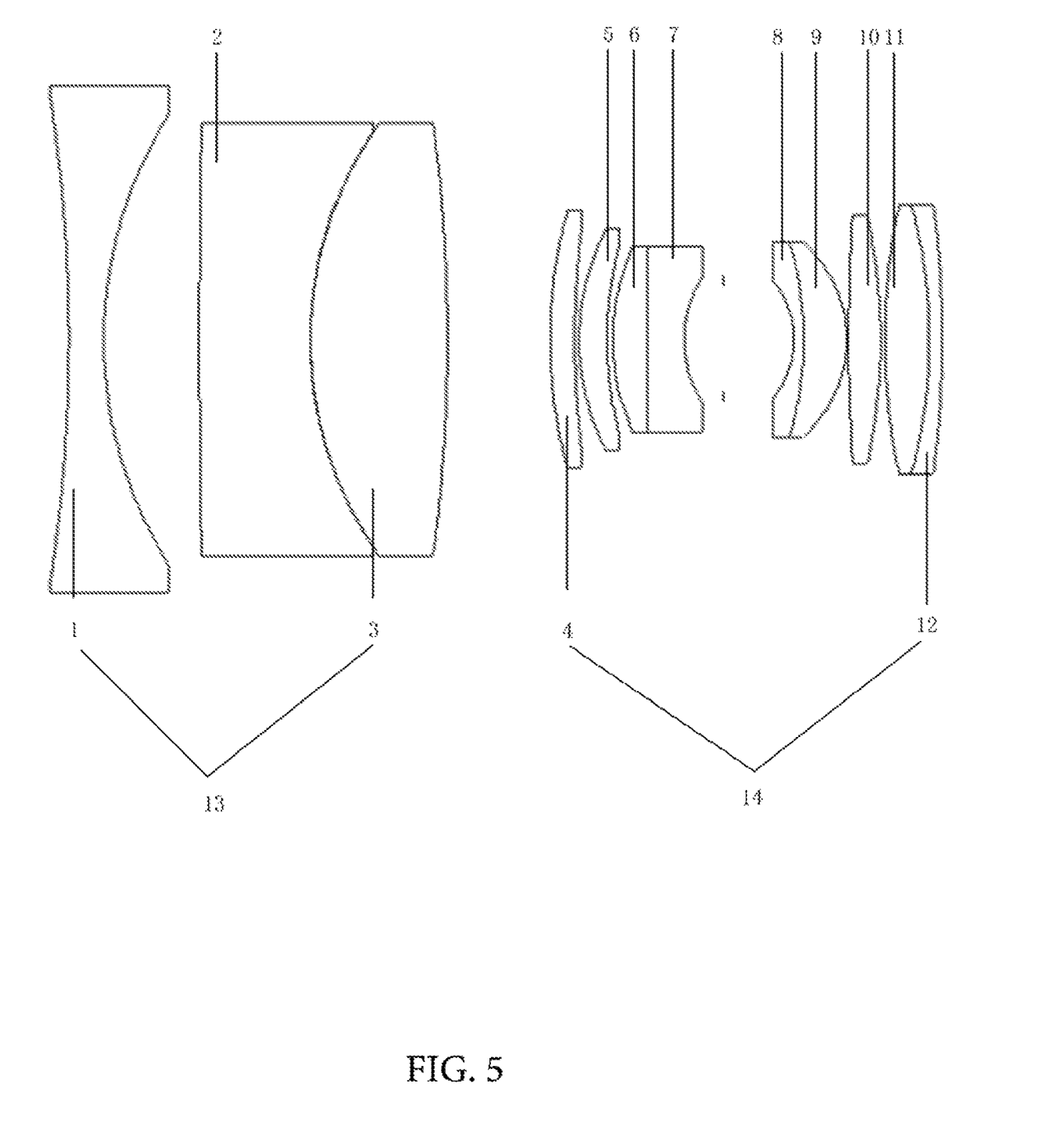
FIG. 5 is an optical structure diagram in an X direction according to a third embodiment of the present invention.
Figure 6:
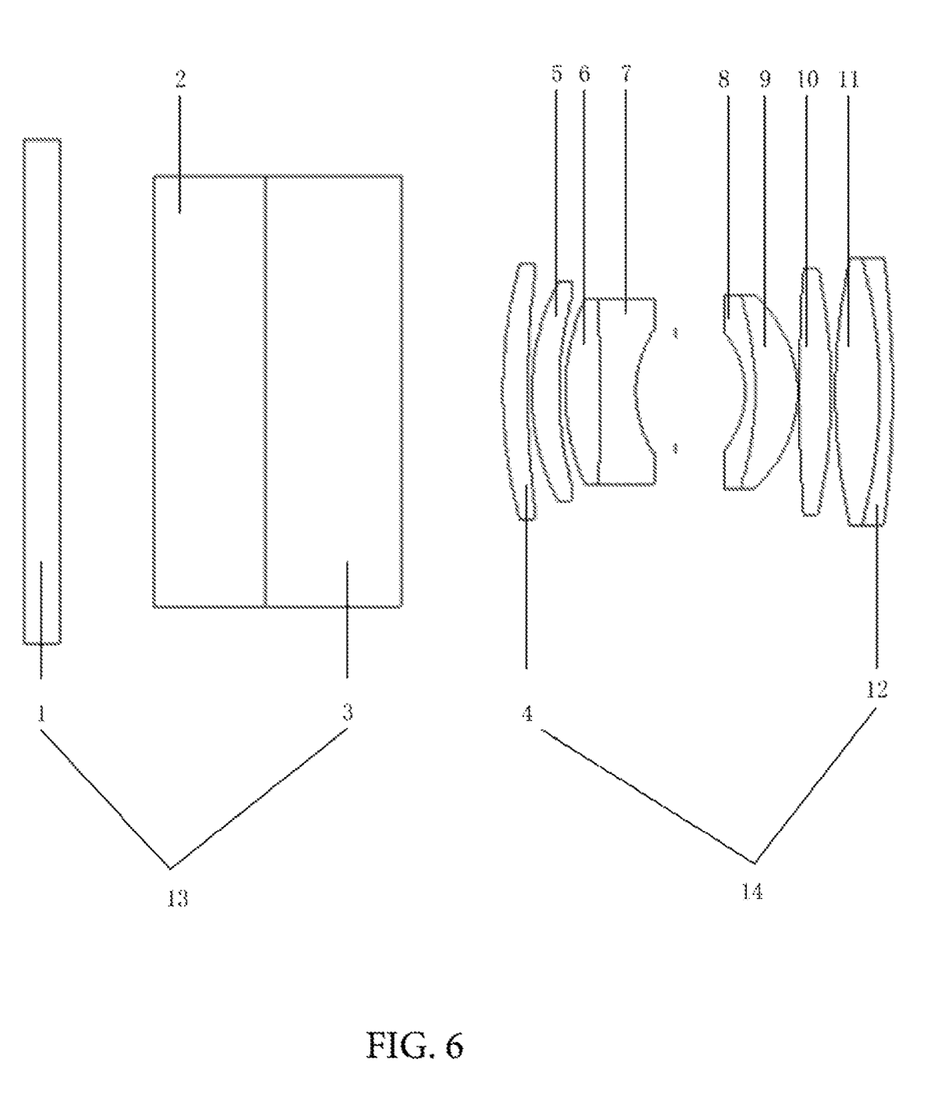
FIG. 6 is an optical structure diagram in an Y direction according to a third embodiment of the present invention.

As shown in FIGS. 5 and 6, embodiments of the invention may provide a 35 mm focal length half-frame large aperture anamorphic lens. In one example, Example 3 differs from the Example 1 in that the negative optical power fourth lens 4 may be replaced with a positive optical power spherical lens.

Obviously, the foregoing embodiments may merely be an example with clear description and not as a limitation. For those of ordinary skill in the art, other different forms of changes or modifications may be made on the basis of the above description. Some of the obvious changes or modifications may include, as listed below:

In one embodiment, based on Example 1, the joined sixth lens 6 and the seventh lens 7 may be divided into two independent lenses.

In one embodiment, based on Example 2, the fourth lens 4 and the fifth lens 5 may be joined or combined into one lens.

In one embodiment, based on Example 1, the joined eighth lens 8 and the ninth lens 9 may be divided into two independent lenses.

In one embodiment, based on Example 1 and Example 2, the joined eleventh lens 11 and the twelfth lens 12 may be combined into one lens.

In one embodiment, based on Example 1 and Example 2, the fifth lens 5 and the eleventh lens 11 may be easily split into two or more lenses, as long as the optical power of the split lens group is within the range of the original optical power. Other modifications based on above examples may be within the scope of the invention. There is no need and cannot be exhaustive for all implementations. However, the obvious changes or variations introduced thereby are still within the protection scope created by the present invention.

What is claimed is:

1. A large aperture anamorphic lens comprising:
An anamorphic group comprising cylindrical lenses and an imaging group comprising spherical lenses, wherein the anamorphic group and the imaging group are dispose with respect from an object side to an image side;
wherein the anamorphic group, from the object side to the image side, sequentially arranges a first lens (1), a second lens (2), and a third lens (3), wherein the first lens (1) and the second lens (2) comprise cylindrical lenses with negative optical power, wherein the third lens (3) comprises a positive optical power cylindrical lens;
wherein the imaging group comprise a fourth lens (4) and to an N-th lens in an order along a direction of an optical path toward the image side; wherein N is a natural number greater than or equal to 10;
wherein lenses of the imaging group comprise a optical power distribution meeting a relationship of:

$$300 < \mathrm{abs}(f_{1-3}/f_{4-N});$$

$$30 \text{ millimeter (mm)} \leq f_{4-N} \leq 40 \text{ mm};$$

$$1.20 \leq f_{4-N}/f_{1-3} \leq 1.50;$$

wherein f comprises a focal length of lenses in an X direction, where the subscript number of f represents a number of the nth lenses of the anamorphic lens, thus $f_1$ comprises the focal length in the X direction of the first lens, and $f_{1-N}$ comprises the combined focal length of the first to Nth lenses in the X direction of N number of lenses.

2. The large aperture anamorphic lens according to claim 1, wherein the imaging group comprises a fourth lens (4), a fifth lens (5), a sixth lens (6), The seventh lens (7), the eighth lens (8), the ninth lens (9), the tenth lens (10), the eleventh lens (11), and the twelfth lens (12).

3. The large aperture anamorphic lens according to claim 2, wherein the optical power distribution of the lenses constituting the anamorphic group and the lenses constituting the imaging group comprise the following relationship:

$$-1.40 \leq f_{2-3}/f_1 \leq -1.25;$$

$$1.50 \leq f_{4-7}/f_{4-12} \leq 2.60;$$

$$0.60 \leq f_{8-12}/f_{4-12} \leq 0.80;$$

$$0.90 \leq f_{10-12}/f_{8-12} \leq 1.30;$$

wherein f comprises a focal length of lenses in an X direction, where the subscript number of f represents a number of the 12th lenses of the anamorphic lens, thus $f_1$ comprises the focal length in the X direction of the first lens, and $f_{1-12}$ comprises the combined focal length of the first to 12th lenses in the X direction of twelve lenses.

4. The large aperture anamorphic lens according to claim 3, wherein the fourth lens (4), the seventh lens (7), the eighth lens (8), and the twelfth lens (12) comprise spherical lenses with negative optical power, and wherein the fifth lens (5), the sixth lens (6), the ninth lens (9), the tenth lens (10) and the eleven lenses (11) comprise positive optical power spherical lenses.

5. The large aperture anamorphic lens according to claim 3, wherein the second lens (2) and the third lens (3) are configured to be joined together.

6. The large aperture anamorphic lens according to claim 2, wherein the sixth lens (6) and the seventh lens (7) are configured to be joined together.

7. The large aperture anamorphic lens according to claim 2, wherein the eighth lens (8) and the ninth lens (9) are configured to be joined together.

8. The large aperture anamorphic lens according to claim 2, wherein the eleventh lens (11) and the twelfth lens (12) are configured to be joined together.

9. The large aperture anamorphic lens according to claim 2, wherein a length of the anamorphic lens is less than 115 mm, and a maximum outer diameter of the anamorphic lens is less than 80 mm.

10. The large aperture anamorphic lens according to claim 2, wherein the anamorphic lens has a focal length in a Y direction of 35 mm and an aperture of 1.8.

11. The large aperture anamorphic lens according to claim 2, wherein a mass of the anamorphic lens is less than 700 gram (g).

* * * * *